Jan. 9, 1934.  H. D. BOLTON  1,942,506

THERMOMETER

Filed Feb. 29, 1932

INVENTOR
Harry D. Bolton
BY
D. Clyde Jones
ATTORNEY

Patented Jan. 9, 1934

1,942,506

UNITED STATES PATENT OFFICE 1,942,506

THERMOMETER

Harry D. Bolton, Rochester, N. Y., assignor to Taylor Instrument Companies, Rochester, N. Y., a corporation of New York Application February 29, 1932. Serial No. 595,710

4 Claims. (Cl. 73—52)

This invention relates to thermometers and more particularly to means for fastening the thermometer tubes to a back or support.

In the past, it has been proposed to attach the thermometer tube to a wood back or support by means of narrow metal strips nailed to the support across the thermometer stem. It has also been proposed to attach the thermometer tube to the support by loops of wire or metal ribbon having their ends inserted through apertures in the support where they are fastened. In the case of a wood support, it is frequently undesirable to fasten the retaining strip or strips by nails driven into the support, not only because this operation is expensive, but where the thermometer is to be used in water, as in the case of a bath thermometer, the water enters the wood around the nails causing it to swell and split. In the case of metal back thermometers, it has been proposed to use retaining parts struck up from the metal support, but such an arrangement requires additional operations in the fabrication of the support, so that the cost of the finished thermometer is thereby increased.

The present invention has for its purpose simple inexpensive means whereby a thermometer tube may be quickly and firmly mounted in a thermometer support without the use of nails or parts struck up therefrom.

Figure 1:
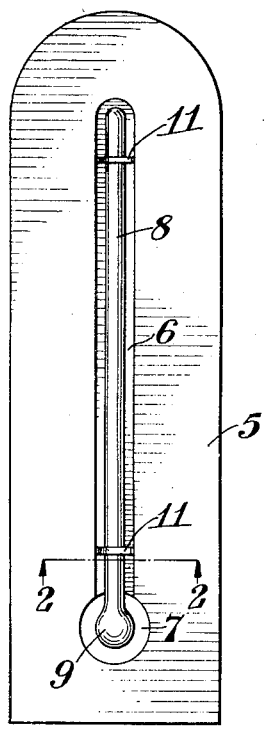
Figure 2:
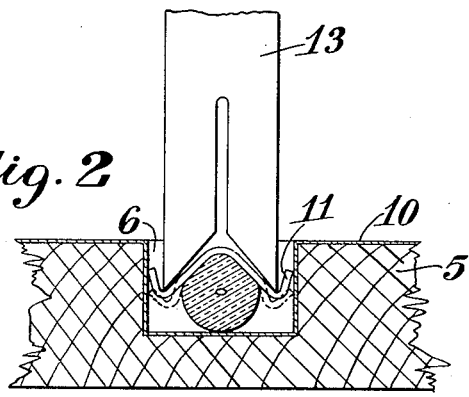

This and other features will appear in the detailed description and claims when taken with the drawing in which Fig. 1 is a front elevation of a thermometer according to the present invention; Fig. 2 is a section taken on the line 2—2 of Fig. 1, showing a portion of a tool or fixture for forcing the attaching means into position to mount the thermometer tubing securely in the thermometer back or support; and Fig. 3 is a view greatly enlarged, of the metal attaching means.

Referring to Fig. 1, 5 designates a thermometer support made of wood having a groove 6 therein communicating with a circular recess 7 to receive respectively the thermometer tube 8 and the bulb 9 thereof. This support, as indicated in Fig. 2, is protected by a layer 10 of paint or other water-proofing material. The thermometer tube 8 and its bulb 9, after being suitably "pointed" corresponding to certain temperatures, is placed in the groove 6 and the recess 7 where it is in part retained by quick-drying lacquer or like cementing material, in proper relation to the scale, which is marked or printed on the face of the support 5. In addition to the cementing material, flexible retaining clips 11 are provided which engage the front face of the thermometer tube and at their ends engage the material at the side walls of the groove 6 to retain the tube in the groove. As illustrated in Fig. 3, each clip is generally triangular to conform to the contour of the lens front of the tube, but the ends of the clip are bent back at an acute angle with respect to the main portion thereof.

These clips may be placed in position, as shown in Fig. 2, by any suitable means but it has been found convenient to use a fork-shaped tool 13, the lower portion only of which is indicated in Fig. 2. It will be noted that the forked ends of this tool engage the clip to force it against the thermometer tube 8, while the natural resilience of the free ends thereof tend to cause them to engage the side walls of the groove with the result that during this operation the clip ends assume the position indicated in dotted lines in Fig. 2. However, when tool 13 is withdrawn the ends of the clips assume the position shown in full lines in this figure, where they engage the side walls of the groove at an acute angle.

Figure 3:
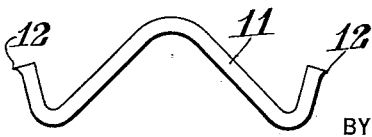

As shown preferably in the exaggerated view of Fig. 3, the retaining clip 11 is made with burrs 12 at its ends, which are formed when the strip is cut or punched from a band of metal. Thus when the strip is forced downward into the groove 6 as shown at Fig. 2, the burrs 12 frictionally engage only the protective covering 10 at the side walls of the groove without breaking through this covering. Thus if the thermometer is used in a liquid such as water, the liquid is prevented from seeping through into the material of the support.

While the invention is herein disclosed as applied to a thermometer support made of wood, it may be used with a support of any material where the ends of the retaining strip can frictionally engage the walls of the groove. Although the side walls of the groove are shown as being plane surfaces, it is obvious that they may be roughened or even provided with recesses into which the ends of the retaining strip may enter.

I claim:

1. In a thermometer, a support having a groove therein, a thermometer tube in said groove, a retaining strip engaging the face of the thermometer having its ends frictionally engaging the walls of the groove, portions of said strip near its ends extending to said groove walls at an acute angle thereto.

2. In a thermometer, a support provided with a groove, a thermometer tube in said groove, a plurality of strips for retaining the thermometer tube in said groove, each of said strips having a portion conforming to the contour of the face of the tube and having its ends bent back upon itself to frictionally engage the side walls of said groove.

3. In a thermometer, a support provided with a groove covered with a protective covering, a thermometer tube mounted in said groove, a plurality of strips engaging the front face of the thermometer tube at spaced intervals along said groove, the ends of each of said strips being provided with burrs to grip the side walls of said groove.

4. In a thermometer, a wood support provided with a groove, said support having a protective coating such as paint, a thermometer tube in said groove, metal retaining clips in said groove for holding said thermometer tube therein, said clips being retained only by engaging the protective coating at the side walls of said groove.

HARRY D. BOLTON.